United States Patent [19]

Psensky

[11] 3,966,165

[45] June 29, 1976

[54] COMPOSITE FLEXIBLE MOLD

[75] Inventor: Miroslav Psensky, Cary, Ill.

[73] Assignee: The Quaker Oats Company, Chicago, Ill.

[22] Filed: Dec. 4, 1974

[21] Appl. No.: 529,334

[52] U.S. Cl. .............................. 249/120; 249/66 A; 249/127; 264/335; 264/337; 425/440; 425/DIG. 44

[51] Int. Cl.[2] ........................ B28B 7/06; B29C 7/00

[58] Field of Search ................ 249/66 R, 66 A, 127, 249/183, 112, 134; 425/440, DIG. 55, DIG. 57, DIG. 58, DIG. 124, DIG. 44; 264/DIG. 50, 304, 313, 314, 336, 315, 335, 318, 334, 224, 219

[56] References Cited

UNITED STATES PATENTS

| | | | |
|---|---|---|---|
| 3,010,157 | 11/1961 | Cizek | 425/DIG. 55 |
| 3,158,906 | 12/1964 | Boyer | 249/183 X |
| 3,309,738 | 3/1967 | Friedman | 425/DIG. 57 |
| 3,329,747 | 7/1967 | Veach | 249/48 X |
| 3,353,220 | 11/1967 | Lenoble | 264/313 X |
| 3,539,144 | 11/1970 | Krug | 249/134 X |
| 3,555,611 | 1/1971 | Reiterman | 249/127 UX |
| 3,607,134 | 9/1971 | McIntyre | 249/134 X |
| 3,776,683 | 12/1973 | Putzer | 425/DIG. 44 X |
| 3,881,682 | 5/1975 | Kin | 249/164 X |

*Primary Examiner*—Francis S. Husar
*Assistant Examiner*—John S. Brown

[57] ABSTRACT

A flexible, distensible mold suitable for use in conjunction with a vacuum pot to shape art forms and utilitarian articles, such as foundry sand articles, is disclosed. The composite mold provides an integral, internal, flexible, stretchable shaping element thereof having shaping surfaces therein to confine and shape and hardenable or otherwise curable material being molded, and an outer second element which is a flexible, stretchable element distinct and separate from the first, the outer element being in direct and closely confining contact with the inner element, the outer element being in a condition of stress due to stretching.

3 Claims, 16 Drawing Figures

FIG. 16
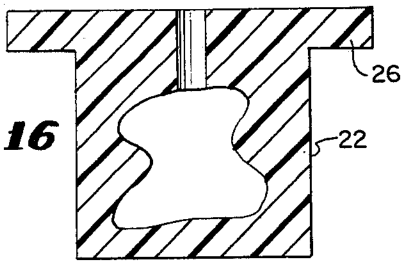
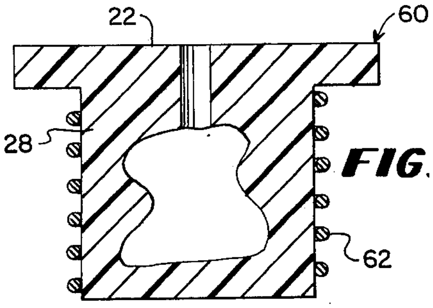
FIG. 12
FIG. 9
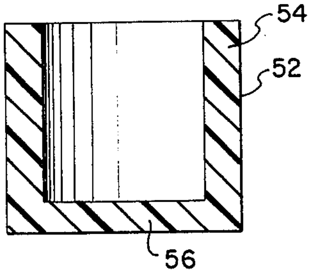
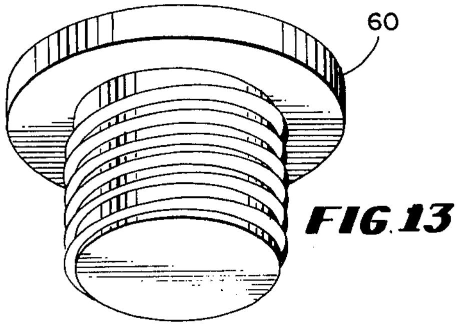
FIG. 13
FIG. 10
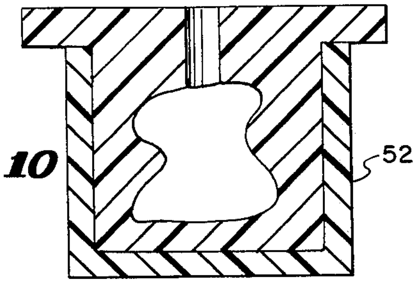
FIG. 14
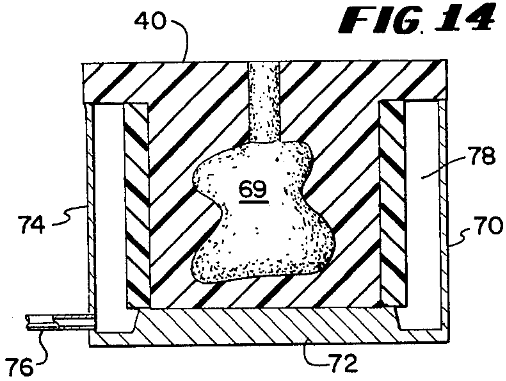
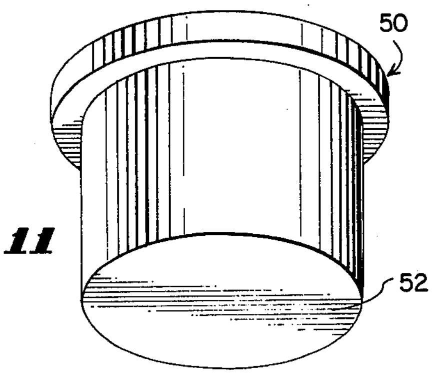
FIG. 11
FIG. 15
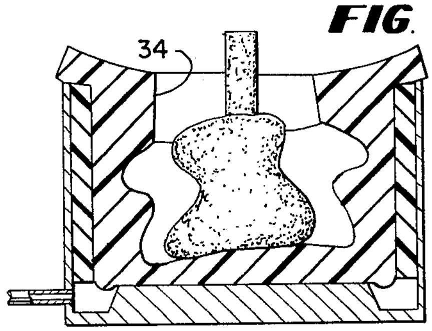

COMPOSITE FLEXIBLE MOLD

This invention relates to flexible, stretchable molds used to fabricate art forms as well as utilitarian articles such as foundry sand shapes. U.S. Pat. No. 2,124,871 to C. L. Beal, and U.S. Pat. No. 3,776,683 to Raymond A. Putzer are illustrative of patents heretofore available relating to the use of flexible, distensible molds. In accordance with the methods disclosed in these patents, the flexible, distensible molds are provided with radially extended flanges which cooperate with structural elements in a vacuum pot whereby, upon drawing of a vacuum in the space between the mold and the pot the walls of the flexible, distensible mold extend to increase the diameters of the relatively smaller bores in the mold to such an extent that the larger diameters of relatively larger portions of the shaped body can be drawn through the bores for removal of the shaped article from the mold.

One of the fundamental problems which has been encountered in the development of the flexible molds is the distortion of the mold by the packed material either as a result of forces applied during packing, or as a result of forces applied as a result of the shear weight of the packed material. The distension of the mold may be relatively slight, but in this era of modern technology in which operating standards tend to be extremely high, even relatively small distension or deformity of the mold during packing or at any time prior to hardening of the shaped article, is not acceptable in many instances and is considered to be "distortion".

The apparatus, molds, and methods disclosed in the Beal and Putzer patents are highly advantageous with respect to ease of removal of the freshly hardened article from the mold. Various suggestions have been made to overcome flexible mold distortion, particularly with respect to production of larger or intermediate size sand shapes, for example. It has been suggested that in relatively large molds the flexible material be supported by metal flasks and the like which snugly confine the mold. The use of such flasks requires many additional operating steps and is cumbersome and expensive. Also various suggestions relating to increasing the thickness of the flexible wall have been made, but mere increase in thickness to provide resistance to deforming forces is self-defeating and expensive. The flexible molds should be readily expandable under air pressure differential and undue increase in mold thickness defeats the stretchability of the mold walls.

The present invention provides a composite flexible mold comprising: an integral, internal, flexible, stretchable shaping element having a shaping cavity therein, which shaping cavity shapes and confines the hardenable or otherwise curable material being molded; an outer second element which is a flexible, stretchable element distinct and separate from the first element, the outer element being in direct and closely confining contact with the inner element, said outer element being in a condition of stress due to stretching of the outer element.

The invention is described hereinafter in general and with respect to particularly preferred embodiments with the aid of the accompanying drawings in which:

FIGS. 1, 5, and 16 are cross-sectional, elevational views of the respective inner elements in the molds illustrated in FIGS. 4, 8, and 11, respectively;

FIGS. 2, 6, and 9 are cross-sectional, elevational views taken through the midline of outer elements in "at rest" condition, which outer elements are those utilized in FIGS. 4, 8, and 11, respectively;

FIGS. 3, 7, and 10 are cross-sectional, elevational views of respective assemblies of composite molds shown in FIGS. 4, 8, and 11;

FIS. 4, 8, and 11, are perspective views of assembled composite molds in accordance with the present invention;

FIG. 12 is a cross-sectional, elevational view similar to that shown in FIGS. 1, 5, and 16 of the mold shown in FIG. 13;

FIG. 13 is a perspective view of an assembled composite mold in accordance with the present invention;

FIG. 14 is a diagramatic sectional view of the filled mold of FIG. 7 in accordance with the present invention in operating position in a vacuum pot; and FIG. 15 is a diagramatic sectional view which shows the condition of the mold and the relative configuration of the mold and pot when the vacuum is applied in the air space between the mold and the pot.

Figure 1:
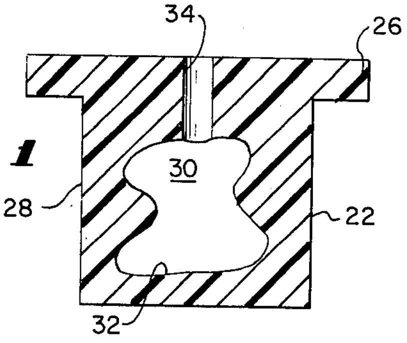

Four preferred embodiments of the present invention are illustrated. One embodiment is illustrated using FIGS. 1–4, inclusive; a second embodiment is illustrated using FIGS. 5–8, inclusive; a third embodiment is illustrated using FIGS. 9–11, and 16, inclusive; and a fourth embodiment is illustrated with the aid of FIGS. 12 and 13. Exemplary use of any of the composite molds in accordance with the present invention is illustrated in FIGS. 14 and 15, and it is the use of the mold shown in FIG. 7 which is illustrated for exemplary purposes.

With respect to the embodiment illustrated in FIGS. 1–4, a composite mold in accordance with the present invention is generally indicated by the numeral 20. The composite mold 20 includes an inner element 22 and an outer element 24. Each of these respective elements 22, 24 is made of flexible, distensible, elastomeric material.

The materials used to make flexible, distensible molds are well known in the literature and patent art materials and methods of shaping the flexible materials will not be discussed herein because they do not constitute part of the present invention.

Figure 2:
Figure 3:
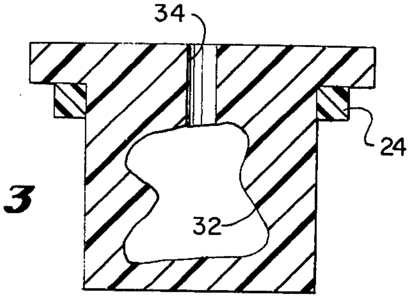
Figure 4:
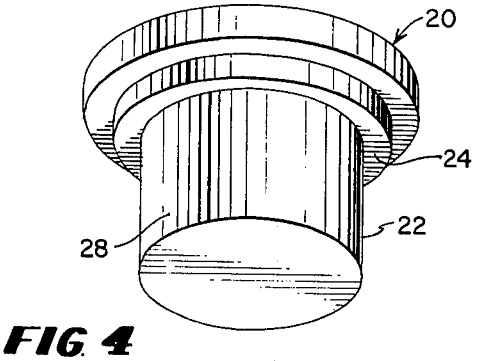

Inner element 22, in the preferred embodimet, includes a radially extending top flange portion 26 and a main body portion 28 dependent therefrom. Inner element 22 includes the shaping cavity 30 which includes a main body portion 32 and a rising relatively narrow neck portion 34. As indicated above, the respective embodiments are shown with the components arranged one above the other and the outer element 24 is shown in FIG. 2 immediately below the inner element 22 in FIG. 1 for the purpose of illustrating relative dimensions thereof. It will be apparent from a comparison of FIG. 1 and FIG. 2 that the outside diameter of the outer element 24 is approximately the same as the outer diameter of the inner element 22, and that the inside diameter of the outer element 24 is substantially smaller than the outside diameter of the body portion 28 of inner element 22. In accordance with the present invention, the stretchable, extensible, elastomeric outer element 24 is stretched and the inner element 22 and passed around inner element 22 and placed on element 22 so that the annular outer element resides in direct and closely confining contact with the inner element 22, the outer element now being in a condition of stress due to the stretching of the outer element 24.

Figure 6:
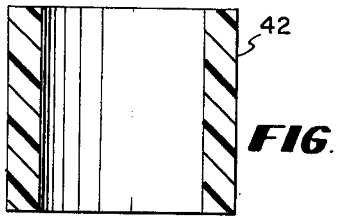
Figure 7:
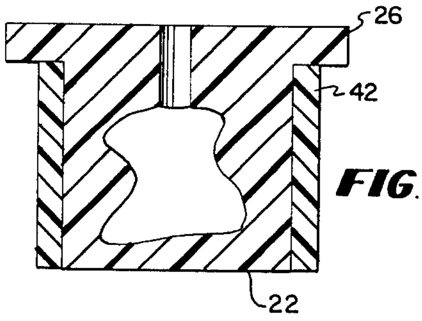
Figure 8:
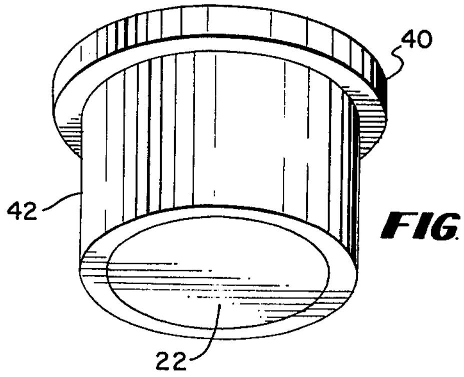

A second embodiment of the present invention is illustrated in FIGS. 5–8. In FIG. 8 a composite mold in accordance with the present invention is generally indicated by the numeral 42 and it includes, for example, an inner element 22 which is substantially identical to the inner element 22 referred to in connection with FIG. 1. Consequently, the description of the details of element 22 will not be repeated herein inasmuch as the inner element is identical to that discussed hereinbefore in connection with FIG. 1.

Figure 5:
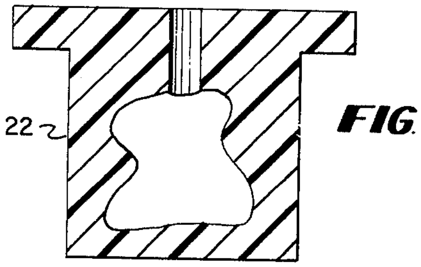

Outer element 42 is illustrated in FIG. 6 in its "at rest" condition and the positioning of element 42 in FIG. 6 immediately below the inner element 22 in FIG. 5 is intended to illustrate relative dimensioning of these elements. Thus, as in the case of the outer element 24 shown in FIG. 2, the outside diameter of the outer element 42 in FIG. 6 is substantially equal to the outside diameter of the body portion 28 of inner element 22 shown in FIG. 5, and the inside diameter of outer element 42 is substantially smaller than the outside diameter of body portion 22. In accordance with the present invention outer element 42 is stretched to permit insertion of body portion 22 within outer element 42 as shown in FIG. 7 wherein one end of outer element 47 abutts the radially extending flange portion 26 and the other end thereof is substantially coextensive with the bottom of body portion 22. However, it will be apparent from a comparison of FIGS. 7 and 6 that the outer element 42 is in a substantially stressed, stretched condition when assembled as shown in FIG. 7 so that in the assembled condition the outer element 42 is in direct and closely confining contact with the inner element, the inner element being in an "at rest" condition, and the outer element being in a stressed condition due to stretching of the outer element 42.

A third embodiment in accordance with the present invention is illustrated by means of FIGS. 9–11 and 16. A mold in accordance with the third embodiment of the present invention is generally idicated by the numeral 50 in FIG. 11. The mold 50 includes an inner element 22 which is substantially identical to the inner element 22 discussed in connection with FIG. 1. Consequently, the structural details of inner element 22 will not be repeated in detail. In accordance with the embodiment illustrated in FIGS. 9–11 and 16, however, the outer element 52 has a cup shape including relatively thick side walls 54 above bottom 56. It is noted that the height of the side walls 54 above bottom 56 is substantially less than the height of the side walls of body portion 22 as measured from the bottom of body portion 22 to the juncture of bottom portion 22 with radially extending flange portion 26. Also, it is noted that the dimensions of outer portion 52 are such that the inside diameter of outer portion 52 are, again, substantially smaller than the outside diameter of the body portion 28 of inner element 22.

In accordance with the present invention the cup-shaped outer element 52 is stretched and the inner element 22 is inserted therein. The side walls 52 are also stretched axially prior to seating against inner element 22, so that the side walls 52 are stressed not only with respect to the stretching around its circumference in a radial plane normal to the axis, but moreover, with respect to, and due to, the stretching in the axial direction. FIG. 11 shows the assembled embodiment 50 with outer element 52 in place.

A fourth embodiment of the present invention is shown in FIG. 12 in which the numeral 60 is used to generally indicate a mold assembly in accordance with this alternative embodiment of the present invention. FIG. 60 shows an inner shaping element 22 which is substantially identical to the inner shaping elements 22 referred to hereinbefore. Mold 60 includes elongated, stressed elastomeric ribbon 62 which is wound around the body portion 28 so that it is in stressed condition and in direct and closely confining contact with the inner element, the outer element 62 being in a condition of stress due to the stretching. The ends of elongated ribbon 62 are tucked under band 62, but cohesion of band 62 with mold element 22 greatly assists in maintaining band 62 in position.

The use of the molds in accordance with the present invention is further illustrated by means of FIGS. 14 and 15 in which an assembled mold 40 is shown, for illustrative purposes, packed with sand 69 and residing within a vacuum pot 70. Vacuum pot 70 includes a bottom 72 and side walls 74 through which a vent conduit 76 passes. Insertion of mold 40 into pot 70 provides a sealing contact between side walls 74 and radially extending flange portion 26. Also, the dimensioning of the mold and vacuum pot is such that an air space exists between the assembled mold 40 and side walls 74. Thus, upon drawing a vacuum in the air space 78 the mold is stretched to the configuration approximately shown in FIG. 15 wherein the shaping activity is greatly enlarged thus permitting axial withdrawal of the hardened article through the relatively narrow neck portion 34.

With respect to general considerations of the composite flexible molds in accordance with the present invention, these molds differ from the composite molds which have been heretofore known in the art inasmuch as, generally speaking, the composite molds of the prior practice involve a plurality of elements within the shaping chamber. In accordance with the present invention, the shaping cavity is a cavity within an integral inner shaping element, and the second element in accordance with this invention has no direct connection with the material being shaped, but, rather, resides in direct, closely confining contact with the first element which provides the shaping cavity, to prevent distortion of that element providing the shaping cavity. The mold of the present invention is well applicable to any vacuum release technology such as that disclosed in the Beal patent and in the Putzer patent and is applicable to substantially any flexible molds. Of course, the present invention is compatable with the use of additional molding elements within the shaping cavity. Thus, it is not intended that the invention be unduly limited to the illustrative embodiments which are used as examples, and it will be apparent that many combinations and changes can be made without departing from the spirit and scope of the present invention.

In accordance with the present invention the net amount of elastomeric material which is used to provide the same degree of dimensional stability is substantially less than that necessary to increase stability of the shaping cavity by increasing wall thickness, and yet the flexibility and stretchability of molds of this invention is not adversely affected to the extent that it would have been, had the dimensional stability been provided by merely increasing wall thickness. In accordance with the present invention the walls of the mold, both with respect to the inner relaxed, unstretched material and with respect to the outer stressed element, can be made thinner thus providing improved economy with respect to the raw material requirements, and providing greater flexibility and stretchability because of the thinness, relatively speaking. The use of the present invention is especially advantageous for use where the inner molds have a relatively round outer configuration where confined by the second element.

I claim:

1. A composite flexible mold comprising an integral, inner, flexible, stretchable shaping element having a shaping cavity therein, for confining and shaping hardenable or otherwise curable material; and an outer second element which is a flexible, stretchable element distinct and separate from the first element, the outer element being in direct and closely confining contact with the inner element, the outer element being in a condition of stress due to stretching thereof and in which the outer element has a portion thereof having the configuration of a sleeve, and in which the outer element is stretched axially as well as circumferentially while in said direct and closely confining contact.

2. A composite flexible mold comprising: an integral, inner, flexible, stretchable shaping element having a shaping cavity therein, for confining and shaping hardenable or otherwise curable material; and an outer second element which is a flexible, stretchable element distinct and separate from the first element, the outer element being in direct and closely confining contact with the inner element, the outer element being in a condition of stress due to stretching thereof, and in which said outer element is cup shaped.

3. A composite, flexible mold comprising: an integral, internal, element having a shaping cavity therein; and an outer second element; said first and second elements being flexible and stretchable; said outer element being separate and distinct from the first element and being in direct and closely confining contact with said inner element; said outer element being in a condition of stress due to stretching of the outer element; said inner element including a radially extending top flange portion and a body portion dependent therefrom; said second outer element residing around at least a portion of said body portion, and wherein the outer element is stretched axially as well as circumferentially.

* * * * *